Patented Feb. 24, 1942

2,273,925

UNITED STATES PATENT OFFICE 2,273,925

STABILIZED DRILLING MUD

Donald C. Bond, Northbrook, and Charles W. Botsford, Niles Center, Ill., assignors to The Pure Oil Company, Chicago, Ill., a corporation of Ohio No Drawing. Application November 30, 1940, Serial No. 368,038

20 Claims. (Cl. 252—8.5)

This invention relates to drilling wells and is primarily concerned with the production of improved positive colloid drilling muds and compositions for the preparation thereof for use in the drilling of wells and with the method of drilling wells wherein such muds are used.

In drilling wells for oil and gas by rotary tool methods, it is common practice to circulate a drilling fluid known as drilling mud down through the drill pipe and bit and return through the bore hole. The circulated drilling fluids serve to lubricate the drill pipe, cool the bit, carry cuttings out of the hole to the surface and to seal and hold the penetrated formation wall in place. It is also an important function of the drilling mud to prevent the escape of gas and other high pressure fluids from the penetrated formations, into the bore hole. Since the prevention of the entrance into the bore hole of the high pressure fluid is accomplished by the hydrostatic head of the mud fluid, it is desirable that this fluid should have a maximum density compatible with other desirable characteristics and weighting materials such as barytes, hematite and finely divided iron may be employed for the purpose of increasing the density.

The existence of an excess of pressure of the drilling fluid in the bore hole over that in the formation, however, results ordinarily in the penetration and loss to the formation of a quantity of the liquid portion of the drilling fluid, and also results in the deposit of a cake of solid material from the mud on the formation wall, from which the liquid has been removed by penetration or infiltration into the formation. Many formations which have great structural strength when dry or undisturbed, lose their strength to a great degree when penetrated by the drill and saturated by the liquid from the drilling fluid. This penetration of the liquid portion of the drilling fluid into the exposed formation frequently results in what has commonly been known as swelling, heaving or caving and damage to productive sands may result. A number of such unsatisfactory properties inherent in ordinary drilling muds disclosed by the prior art may be avoided and other advantages obtained by the use of basic dye, positive colloid muds such as are described in application Serial No. 303,024, filed November 6, 1939, in the name of Donald C. Bond.

It is an object of this invention to provide an improved composition useful in the preparation of drilling muds.

It is another object of this invention to provide a basic dye positive colloid drilling mud of improved stability and formation sealing properties.

It is still another object to provide an improved method of drilling, particularly in heaving shale formations.

Various other objects and advantages will appear as a description of the invention proceeds.

It has been found that the stability and formation sealing properties of basic dye positive colloid muds may be greatly improved by incorporating therein small quantities of one or more materials selected from the group consisting of starch, wheat gluten and acid casein. It is recognized that in the past a wide variety of materials have been added to drilling mud in order to improve various properties thereof. For example, in Patent 2,209,591, the following materials are disclosed as effective additives for improving the formation sealing properties of ordinary drilling muds: glue, casein, milk powder, blood albumin, gelatin, gum arabic, copal, seaweed, agar agar, cotton seed meal, linseed cake, wheat flour, corn starch, quebracho, psyllium speed, dextrose, molasses, corn syrup, montan wax and saponified montan wax. However, from the results of an extensive investigation it has been found that in general these materials as well as numerous other similar materials, are not satisfactory for improving the stability and formation sealing properties of basic dye positive colloid mud. The results of tests on a large number of different additives of widely varying composition in basic dye positive colloid muds show that only starch, wheat gluten and acid casein have substantial merit for improving the stability and formation sealing properties of such muds.

Table I indicates the effectiveness of some of the foregoing materials, in admixture in relatively small proportions in basic dye positive colloid mud, in inhibiting fluid penetration and improving stability.

those muds having superior formation sealing properties. Any samples which showed over 5

Table I

| Sample number | Additive | | pH of mud | Stability, cc. separation of supernatant liquid at 150° F. | Filter test | |
|---|---|---|---|---|---|---|
| | Protein | Percent by weight | | | Cc. filtrate in 30 min. at 100 p.s.i. and 120° F. | Cc. filtrate in 15 min. at 10 p.s.i. and room temp. |
| 1 | None | | 1.70 | Poor | 104 | |
| 2 | Acid casein | 5.0 | 3.35 | 0 | 3 | |
| 3 | Wheat gluten | 5.0 | 4.71 | 15 | 6 | |
| 4 | Gelatin | 10.0 | 4.05 | (Solid) | | 20 |
| 5 | ---do--- | 10.0 | 3.20 | (Solid) | | 18 |
| 6 | Soy bean, pure | 5.0 | 3.92 | | | Poor |
| 7 | Soy bean, tech | 4.0 | 5.65 | | | Poor |
| 8 | Peanut | 5.0 | 5.31 | 140 | | Poor |
| 9 | ---do--- | 5.0 | 4.75 | 150 | | Poor |
| 10 | Corn gluten | 5.0 | 3.72 | 120 | | |
| 11 | ---do--- | 5.0 | 3.54 | 135 | | |
| 12 | ---do--- | 10.0 | | | | Poor |
| 13 | ---do--- | 10.0 | | | | Poor |
| 14 | Mazein | 5.0 | | Poor | | |
| 15 | ---do--- | 5.0 | | Poor | | |
| 16 | B glucoside | 10.0 | | | | Poor |
| 17 | ---do--- | 10.0 | | | | 15 |
| 18 | Tetraphospho-glucosate | 10.0 | | | | 20 |
| 19 | ---do--- | 10.0 | | | | 17 |
| 20 | Rennet casein | 5.0 | 3.85 | | | Poor |
| 21 | ---do--- | 5.0 | 3.70 | | | Poor |
| 22 | ---do--- | 5.0 | 3.40 | | | Poor |
| 23 | ---do--- | 5.0 | 3.05 | | | Poor |

The percentage of additive indicated in the various samples in Table I, is percent by weight based on the unweighted mud. With the exception of the particular additive employed, all of the muds in Table I have the same composition and were prepared in the following manner: 3% by weight of methyl violet was dissolved in hot water and if any material was to be used to regulate the pH value, this material was added to the hot aqueous methyl violet solution, for example, the pH was reduced in several samples by the addition of small quantities of hydrochloric acid. The appropriate additive was then stirred into the hot solution and the entire mixture maintained at a temperature of about 180° F. for approximately 30 minutes. 2% by weight of bentonite in the form of a 5% aqueous suspension and 0.2% by weight of an anti-gas-cutting agent, diglycol laurate, was added to the mixture with continuous stirring and the entire mixture allowed to stand approximately twenty-four hours at 150° F. This mixture is called the unweighted mud since it contains no weighting agent and it is on this mixture that the weight percentages of dye, bentonite, diglycol laurate and additive are based. 350 grams of commercial barytes known as Baroid-O was thoroughly mixed with 500 grams of the unweighted mud prior to testing the mud for stability and formation sealing properties. The specific gravity of the weighted muds was approximately 1.5.

The stability test consisted of allowing approximately 850 grams of the weighted mud to stand in a graduated cylinder at a temperature of 150° F. for twenty-four hours. At the end of that period the volume of supernatant liquid, free of suspended particles, was measured and in the event that only a relatively small quantity of liquid had separated, top and bottom samples of the portion containing the suspended solids were checked for specific gravity to determine whether or not any weighting material had settled to the bottom.

The formation sealing properties of the muds were tested by measuring the filtration rate of samples of the mud which were filtered under pressure, the lower rates of filtration indicating cubic centimeters of filtrate in 15 minutes under 10 p. s. i. pressure and using 4.37 square inches of filtering surface at room temperature were considered to be unsatisfactory from a standpoint of formation sealing properties and were not subjected to the more rigorous filtration test of 30 minutes at 100 p. s. i., 120° F. and using 16 square inches of filtering surface.

It will be noted that in many cases either the stability test or the filtration test of various samples has been omitted. This is due to the fact that in most cases as soon as a sample was found to be unsatisfactory in either stability or formation sealing properties, further tests were considered to be useless since in order to be a satisfactory drilling mud, the mud must possess desirable properties as to both of these characteristics.

All of the filtration results marked "poor" are tests which showed over 5 cc. of filtrate in 15 minutes at 10 p. s. i. Frequently those samples produced so much filtrate in such a short period of time that a satisfactory determination of the volume of filtrate for the 15-minute period could not readily be made. The stability results marked "poor" are tests which showed over 100 cc. of separation in samples of approximately 850 grams which had been allowed to stand 24 hours.

The results in Table I clearly show that positive colloid basic dye drilling muds containing 2% of bentonite and 3% of methyl violet are not stable and that stable muds having satisfactory formation sealing characteristics and containing the same amounts of bentonite and methyl violet can only be obtained by the addition of two of the many protein compounds tested, namely, acid casein and wheat gluten. When the latter materials were used, drilling mud possessing excellent formation sealing properties and a high degree of stability were obtained.

Similar tests were obtained on a series of drilling muds in which the unweighted mud contained 1% by weight of bentonite and 2% by weight of methyl violet, the remainder of the unweighted drilling mud consisting of the usual 0.2% by weight of diglycol laurate, water and the indicated proportion of additive. Stability and filtration tests were determined on weighted samples as in the tests shown in Table I. 500 grams of the unweighted mud was mixed with 350 grams of Baroid-O in order to obtain the final weighted mud. The results of these tests are shown in Table II.

been added a modicum of material selected from the group consisting of starch, wheat gluten and acid casein.

2. A drilling mud in accordance with claim 1 where the amount of material added is between approximately 1% and 10% by weight based on unweighted mud.

Table II

| Sample number | Additive | | pH of mud | Stability, cc. separation of supernatant liquid at 150° F. | Filter test | |
|---|---|---|---|---|---|---|
| | Protein | Percent by weight | | | Cc. filtrate in 30 min. at 100 p.s.i. and 120° F. | Cc. filtrate in 15 min. at 10 p.s.i. and room temp. |
| 24 | Wheat gluten | 7.5 | 5.52 | 0 | 6 | |
| 25 | Wheat starch | 5.0 | 5.02 | 0 | 5 | |
| 26 | Corn starch | 5.0 | 4.95 | 0 | 8 | |
| 27 | Potato starch | 5.0 | 5.08 | 0 | 8 | |
| 28 | Soya bean protein | 7.5 | 3.88 | | | Poor |
| 29 | Corn gluten | 5.0 | 3.22 | Poor | | |
| 30 | ...do... | 7.5 | 5.20 | Poor | | 20 |
| 31 | ...do... | 7.5 | 4.10 | Poor | | 2 |

The results in Table II clearly show that the only drilling muds which possessed satisfactory stability and formation sealing characteristics were those muds containing wheat gluten or wheat, corn or potato starch. The remaining muds were entirely unsatisfactory as to either, or both of the aforementioned characteristics.

Summarizing the results shown in Tables I and II, it will be seen that of the numerous additives which were tested, only starch, wheat gluten and acid casein were effective in imparting satisfactory stabilizing and formation sealing properties to basic dye positive colloid drilling muds.

It has been found that the optimum effectiveness of acid casein, wheat gluten and starch may be secured by regulating the pH value of the drilling mud within certain rather well defined limits. For example, most effective results may be secured with acid casein when the pH of the mud is maintained between approximately 3 and 4, whereas most effective results with the starch and wheat gluten may be obtained when the pH is between approximately 5 and 6.5. In no case should the pH of the mud mixture exceed that value at which the basic dye reacts to form the free dye base. This occurs at about pH 7.0 to 7.5.

The amounts of additives which are incorporated in basic dye positive colloid drilling muds may be varied between rather wide limits, but in general not substantially less than 1% by weight nor more than 10% by weight based on the unweighted mud are employed. Ordinarily, best results may be secured when using between approximately 3% and 8% by weight of additive.

When ordinary drilling muds containing organic formation penetration inhibitors of the type hereinbefore described are employed in the usual drilling operations where temperatures are ordinarily favorable for undesirable biochemical changes, it has been found necessary to employ suitable germicides or preservatives such as phenol, cresol, cresylic acid, benzoate of soda and zinc chloride, in the drilling muds. However, in basic dye positive colloid muds, such germicides are unnecessary since the basic dye itself possesses germicidal properties of sufficient strength to prevent the undesirable biochemical changes. Furthermore, the addition of alkaline preservatives of the type of benzoate of soda has an undesirable flocculating effect on such muds.

What is claimed is:

1. An improved drilling mud comprising basic dye positive colloid drilling mud to which has been added a modicum of material selected from the group consisting of starch, wheat gluten and acid casein.

2. A drilling mud in accordance with claim 1 where the amount of material added is between approximately 1% and 10% by weight based on unweighted mud.

3. A drilling mud in accordance with claim 1 where the material added is between approximately 1% and 10% by weight of starch based on the unweighted mud.

4. The drilling mud in accordance with claim 1 where the material added is between approximately 1% and 10% by weight of wheat gluten based on unweighted mud.

5. A drilling mud in accordance with claim 1 where the material added is between approximately 1% and 10% by weight of acid casein based on unweighted mud.

6. A drilling mud in accordance with claim 1 where the material added is between approximately 3% and 8% by weight of acid casein based on the unweighted mud and the pH of the mud is between approximately 3 and 4.

7. A drilling mud in accordance with claim 1 where the basic dye is methyl violet.

8. An aqueous drilling mud comprising positively charged colloidally dispersed mineral particles, methyl violet, weighting agent and between approximately 3% and 8% of material selected from the group consisting of starch, wheat gluten and acid casein.

9. A composition for use in well drilling mud comprising finely divided mineral particles, basic dye in sufficient amount to produce positive charges on the mineral particles when said particles are dispersed in water and a modicum of material selected from the group consisting of starch, wheat gluten and acid casein.

10. A composition in accordance with claim 9 in which the basic dye is methyl violet.

11. A composition for use in well drilling mud comprising bentonite, basic dye in sufficient amount to produce positive charges on the bentonite when the bentonite is dispersed in water and between approximately 1% and 10% by weight based on unweighted composition, of material selected from the group consisting of starch, wheat gluten and acid casein.

12. A composition in accordance with claim 11 where the material is wheat gluten.

13. A composition in accordance with claim 11 where the material is starch.

14. A composition in accordance with claim 11 where the material is acid casein.

15. The process of drilling wells which comprises circulating through the well bore during the drilling operation, mud containing positively charged colloidally dispersed mineral particles, basic dye and a modicum of material selected from the group consisting of starch, wheat gluten and acid casein.

16. The process of drilling wells which comprises circulating through the well bore during the drilling operation, mud containing positively charged colloidally dispersed bentonite particles, basic dye and between approximately 1% and 10% by weight based on the unweighted mud of material selected from the group consisting of starch, wheat gluten and acid casein.

17. The process in accordance with claim 16 where the basic dye is methyl violet.

18. The process in accordance with claim 16 where the material is starch.

19. The process in accordance with claim 16 where the material is wheat gluten.

20. The process in accordance with claim 16 where the material is acid casein.

DONALD C. BOND.
     CHARLES W. BOTSFORD.